United States Patent
Inoue

(10) Patent No.: US 10,747,476 B2
(45) Date of Patent: Aug. 18, 2020

(54) PRINTING APPARATUS, METHOD FOR CONTROLLING THE SAME, AND STORAGE MEDIUM HAVING A WIRELESS COMMUNICATION INTERFACE THAT PERFORMS AN ACCESS POINT OPERATION TO CAUSE THE PRINTING APPARATUS TO OPERATE AS AN ACCESS POINT, AND AN OPERATION CONFORMING TO WI-FI® DIRECT

(71) Applicant: CANON KABUSHIKI KAISHA, Tokyo (JP)

(72) Inventor: Go Inoue, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/030,200

(22) Filed: Jul. 9, 2018

(65) Prior Publication Data

US 2019/0018623 A1    Jan. 17, 2019

(30) Foreign Application Priority Data

Jul. 12, 2017    (JP) .................................. 2017-136442

(51) Int. Cl.
*G06F 3/12*    (2006.01)
*H04W 76/14*    (2018.01)
(Continued)

(52) U.S. Cl.
CPC .......... *G06F 3/1204* (2013.01); *G06F 3/1231* (2013.01); *G06F 3/1236* (2013.01);
(Continued)

(58) Field of Classification Search
None
See application file for complete search history.

(56) References Cited

U.S. PATENT DOCUMENTS 9,501,253 B2    11/2016 Inoue et al.
2012/0133971 A1*    5/2012 Park .................... G03G 15/5004
358/1.15
(Continued)

FOREIGN PATENT DOCUMENTS

JP    2012-186555 A    9/2012
JP    2015-212903 A    11/2015

OTHER PUBLICATIONS

Extended European Search Report dated Oct. 11, 2018, issued in European Patent Application No. 18179783.8.

*Primary Examiner* — Miya J Williams
(74) *Attorney, Agent, or Firm* — Venable LLP

(57) ABSTRACT

A printing apparatus includes a wireless communication interface that operates in a first mode, performing an access point operation to cause the printing apparatus to operate as an access point, and a second mode, performing an operation conforming to Wi-Fi® Direct. In addition, a processor performs operations including setting one of the first and second modes as an operation mode to be used for wireless direct connection with an external apparatus, based on a user instruction, causing, in accordance with the instruction to start an operation for the wireless direct connection, the wireless communication interface to operate in the first mode if the first mode is set as the operation mode, and causing the wireless communication interface to operate in the second mode if the second mode is set as the operation mode, and displaying information indicating the set operation mode on a screen related to the wireless direct connection.

11 Claims, 12 Drawing Sheets

(51) Int. Cl.
*H04W 88/06* (2009.01)
*H04W 88/10* (2009.01)

(52) U.S. Cl.
CPC .......... *G06F 3/1292* (2013.01); *H04W 76/14* (2018.02); *H04W 88/06* (2013.01); *G06F 3/128* (2013.01); *H04W 88/10* (2013.01)

(56) References Cited

U.S. PATENT DOCUMENTS

| | | | |
|---|---|---|---|
| 2014/0044010 A1* | 2/2014 | Hiroshige | H04W 24/02 |
| | | | 370/254 |
| 2014/0268222 A1* | 9/2014 | Inoue | G06F 3/1221 |
| | | | 358/1.15 |
| 2014/0268224 A1* | 9/2014 | Inoue | G06F 3/1211 |
| | | | 358/1.15 |
| 2016/0004490 A1* | 1/2016 | Nagatani | H04L 67/36 |
| | | | 358/1.15 |
| 2016/0378410 A1 | 12/2016 | Inoue | |
| 2017/0055274 A1* | 2/2017 | Tanji | H04W 76/14 |
| 2018/0249313 A1* | 8/2018 | She | H04W 76/14 |
| 2019/0114128 A1* | 4/2019 | Nagahara | G06F 3/1287 |
| 2019/0116289 A1* | 4/2019 | Kawasaki | H04N 1/00307 |

* cited by examiner

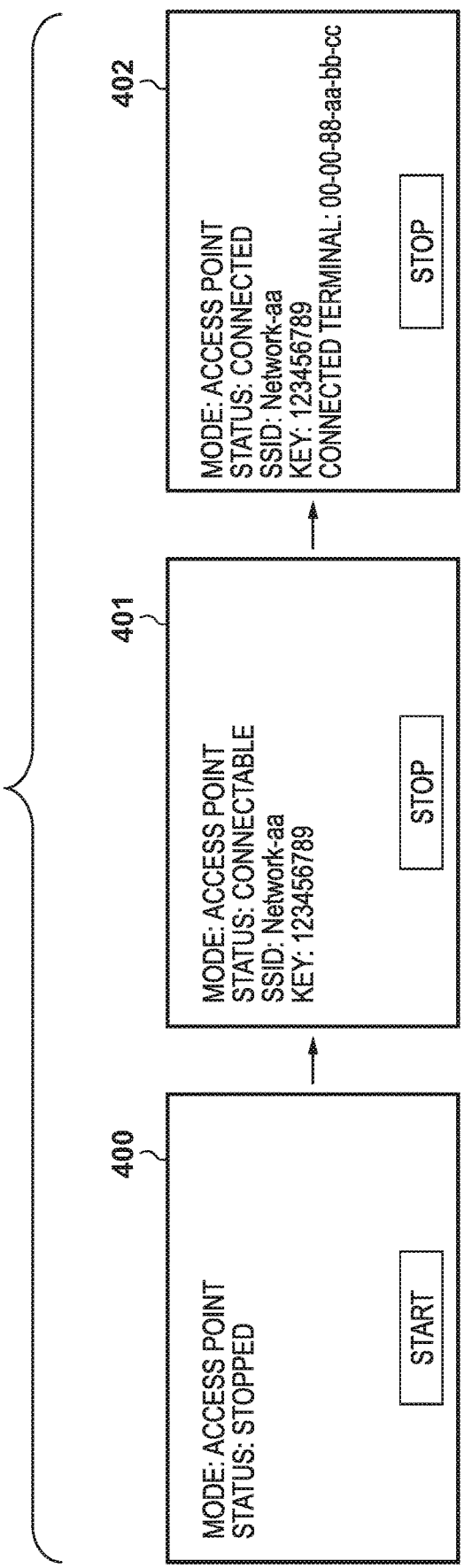

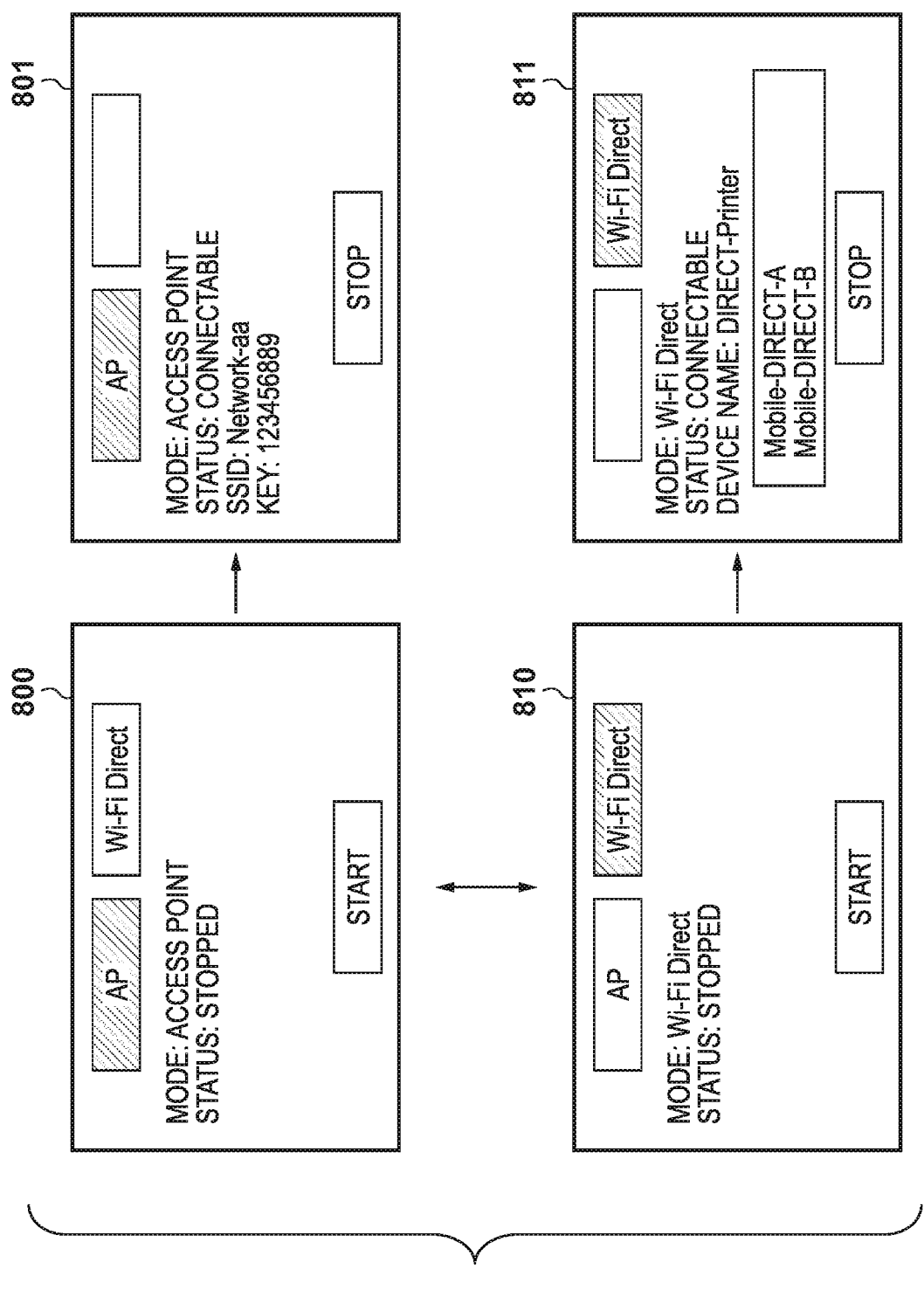

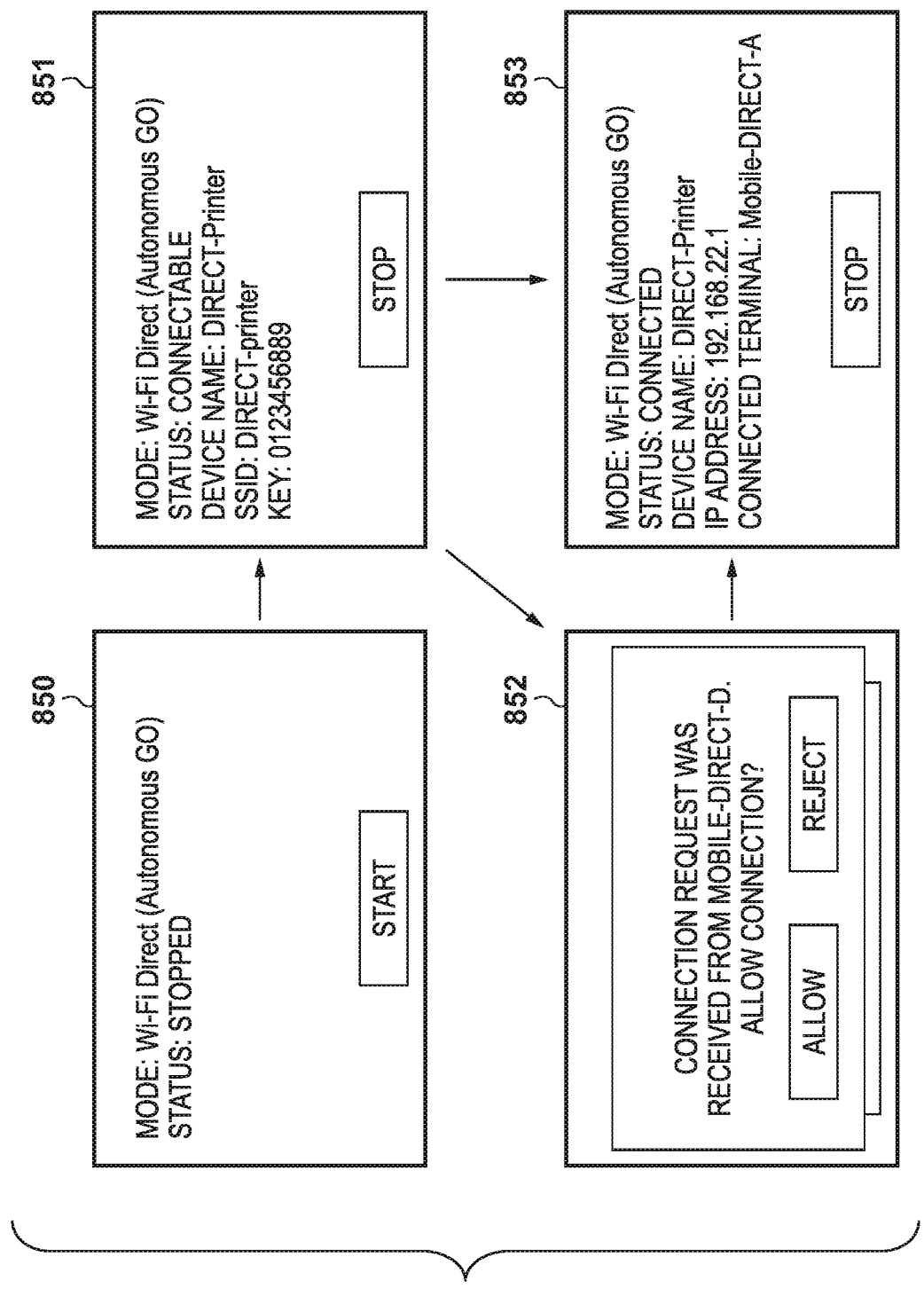

PRINTING APPARATUS, METHOD FOR CONTROLLING THE SAME, AND STORAGE MEDIUM HAVING A WIRELESS COMMUNICATION INTERFACE THAT PERFORMS AN ACCESS POINT OPERATION TO CAUSE THE PRINTING APPARATUS TO OPERATE AS AN ACCESS POINT, AND AN OPERATION CONFORMING TO WI-FI® DIRECT

This application claims the benefit of Japanese Patent Application No. 2017-136442, filed Jul. 12, 2017, which is hereby incorporated by reference herein in its entirety.

BACKGROUND OF THE INVENTION

Field of the Invention

The present invention relates to a printing apparatus, a method of controlling the printing apparatus, and a storage medium.

Description of the Related Art

Increasingly, printing apparatuses, such as multifunctional machines and printers, have a wireless local area network (LAN) function. A printing apparatus equipped with a wireless LAN function can receive print data from an external apparatus, such as a personal computer (PC) or a mobile terminal, via an access point, and execute print processing based on the received print data. Recently, printing apparatuses are known that have a function of wirelessly communicating directly with an external apparatus, rather than via a relay apparatus, such as an access point. For example, Japanese Patent Laid-Open No. 2012-186555 discloses a printing apparatus that wirelessly communicates directly with a mobile terminal, using an access point function. Known examples of such an access point function include an access point mode (software access point (AP) mode) and Wi-Fi® Direct, which is provided by Wi-Fi® Alliance.

There may be cases in which a printing apparatus equipped with a wireless LAN function, as mentioned above, supports both the access point mode and Wi-Fi® Direct as the access point functions. In this case, a user may need to understand whether the access point mode or Wi-Fi® Direct is being used in the printing apparatus. If the user cannot understand whether the printing apparatus is operating in the access point mode or in the Wi-Fi® Direct mode, the user may not be able to appropriately operate a mobile terminal to connect the mobile terminal to the printing apparatus. This may deteriorate usability.

SUMMARY OF THE INVENTION

The present invention has been made in view of the problems noted above. The present invention provides a technique that allows a user to appropriately understand the operation mode used in a printing apparatus for wireless direct connection with an external apparatus.

According to one aspect, the present invention provides a printing apparatus comprising a wireless communication unit capable of operating in a first mode of performing an access point operation to cause the printing apparatus to operate as an access point, and a second mode of performing an operation conforming to Wi-Fi® Direct, a setting unit configured to set one of the first mode and the second mode as an operation mode to be used for wireless direct connection with an external apparatus, in accordance with an instruction from a user, and a control unit configured to control the wireless communication unit in a case of accepting an instruction to start an operation for the wireless direct connection, so as to start an operation in the first mode if the first mode is set as the operation mode, and to start an operation in the second mode if the second mode is set as the operation mode.

According to another aspect, the present invention provides a method of controlling a printing apparatus that includes a wireless communication unit capable of operating in a first mode of performing an access point operation to cause the printing apparatus to operate as an access point, and a second mode of performing an operation conforming to Wi-Fi® Direct, the method comprising setting one of the first mode and the second mode as an operation mode to be used for wireless direct connection to an external apparatus, in accordance with an instruction from a user, and controlling the wireless communication unit in a case of accepting an instruction to start an operation for the wireless direct connection, so as to start an operation in the first mode if the first mode is set as the operation mode, and to start an operation in the second mode if the second mode is set as the operation mode.

According to still another aspect, the present invention provides a non-transitory computer-readable storage medium storing a computer program for causing a computer to execute a method of controlling a printing apparatus that includes a wireless communication unit capable of operating in a first mode of performing an access point operation to cause the printing apparatus to operate as an access point, and a second mode of performing an operation conforming to Wi-Fi® Direct, the method comprising setting one of the first mode and the second mode as an operation mode to be used for wireless direct connection to an external apparatus, in accordance with an instruction from a user, and controlling the wireless communication unit in a case of accepting an instruction to start an operation for the wireless direct connection, so as to start an operation in the first mode if the first mode is set as the operation mode, and to start an operation in the second mode if the second mode is set as the operation mode.

According to the present invention, a user can appropriately understand the operation mode used in a printing apparatus for wireless direct connection with an external apparatus.

Further features of the present invention will become apparent from the following description of exemplary embodiments with reference to the attached drawings.

BRIEF DESCRIPTION OF THE DRAWINGS

FIGS. 4A and 4B show examples of operation screens for giving instructions to start and to stop the wireless direct function.

FIG. 8A shows examples of operation screens for giving instructions to start and to stop the wireless direct function according to a second embodiment.

FIG. 8B shows examples of operation screens for giving instructions to start and to stop the wireless direct function according to a third embodiment.

DESCRIPTION OF THE EMBODIMENTS

Hereafter embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

The first embodiment will describe an example of allowing one of an access point mode and a Wi-Fi® Direct mode to be set as an operation mode in which a printing apparatus 100 performs wireless direct communication with an external apparatus.

Network Configuration

Figure 1:
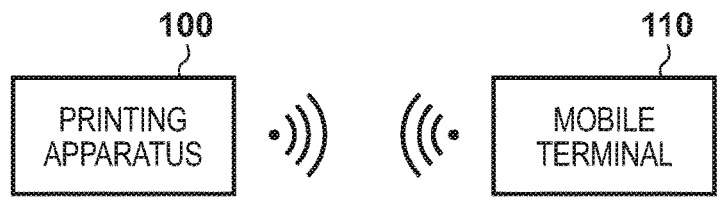
FIG. 1 shows an example of a configuration of a network.

FIG. 1 shows an example of a network configuration that is envisioned in this embodiment. The printing apparatus 100 has a communication function conforming to a wireless local area network (LAN) standard. The printing apparatus 100 can wirelessly communicate directly with a mobile terminal 110, which similarly has a communication function conforming to a wireless LAN standard, rather than via an access point. The printing apparatus 100 supports an access point mode (software access point (AP) mode) and Wi-Fi® Direct, which serve as functions for realizing such wireless direct communication. In the following example, the printing apparatus 100 is connected to one mobile terminal 110, but the printing apparatus 100 may be simultaneously connected to a plurality of mobile terminals.

Configuration of Printing Apparatus

Figure 2:
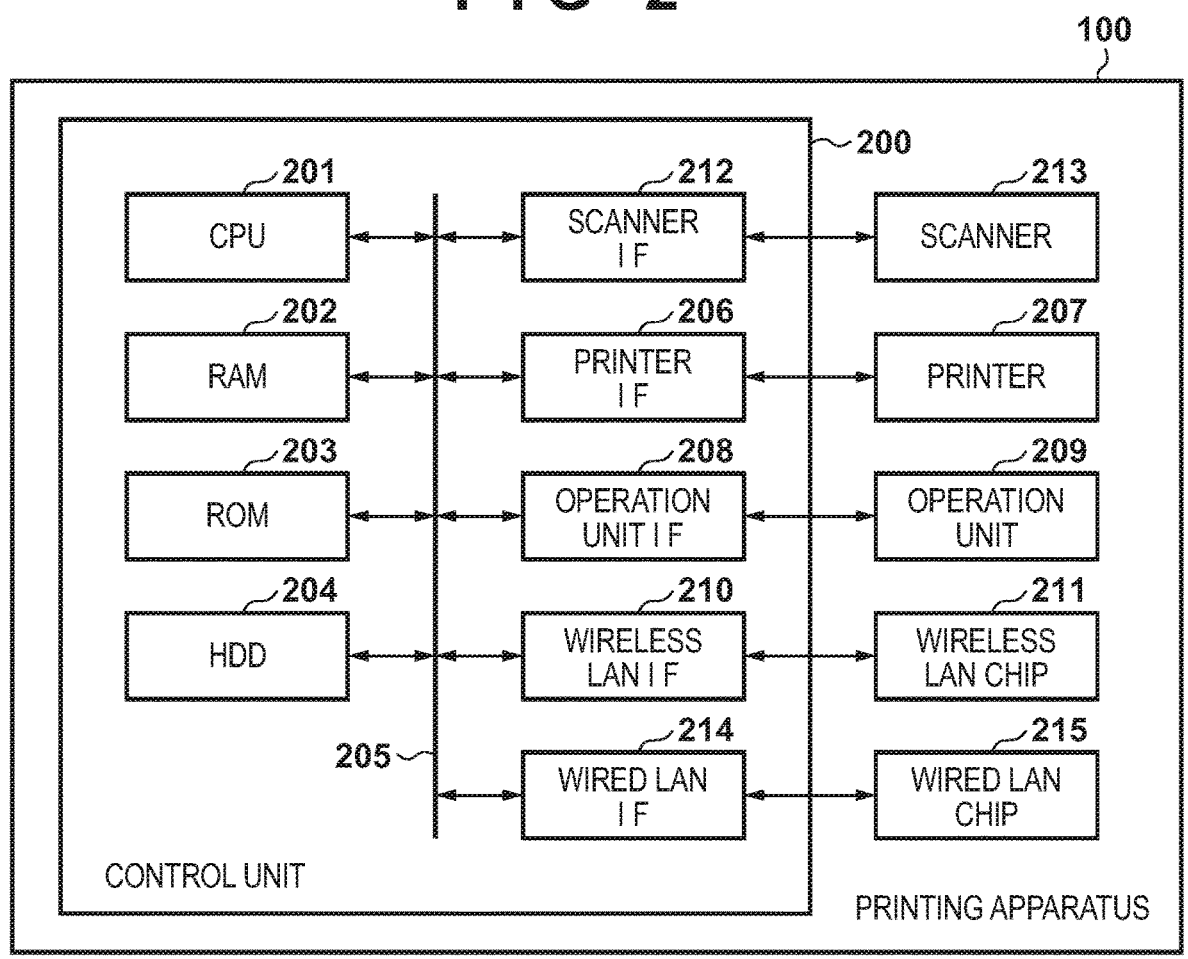
FIG. 2 is a block diagram showing an example of a hardware configuration of a printing apparatus.

FIG. 2 is a block diagram showing an example of a hardware configuration of the printing apparatus 100. The printing apparatus 100 includes a control unit 200, as well as a printer 207, a scanner 213, an operation unit 209, a wireless LAN chip 211, and a wired LAN chip 215 that are connected to the control unit 200. The control unit 200 controls the respective devices connected thereto, thereby realizing various functions, such as a print function, a scan function, a copy function, and a wired or a wireless communication function, in the printing apparatus 100. The control unit 200 includes a central processing unit (CPU) 201, a random access memory (RAM) 202, a read only memory (ROM) 203, a hard disk drive (HDD) 204, a scanner interface (I/F) 212, a printer I/F 206, an operation unit I/F 208, a wireless LAN I/F 210, and a wired LAN I/F 214, which are devices connected to a system bus 205.

The CPU 201 controls operations of the entire printing apparatus 100 by controlling the devices connected via the system bus 205. The RAM 202 is used as a temporary storage area, such as a main memory or a work area, for the CPU 201. The ROM 203 stores a control program for controlling the printing apparatus 100. The CPU 201 executes various kinds of processing for controlling operations of the printing apparatus 100 by loading the control program stored in the ROM 203 to the RAM 202 and executing this program. The HDD 204 stores various programs, as well as various kinds of data, such as print data and image data. Although this embodiment describes an example in which one CPU 201 executes later-described processing (illustrated in the flowcharts), the present invention is not limited thereto. For example, the printing apparatus 100 can also be configured so that a plurality of CPUs cooperate to execute the processing.

The printer 207 executes print processing based on image data output from the control unit 200. The printing apparatus 100 can execute print processing using the printer 207 based on print data received from an external apparatus, such as the mobile terminal 110, or image data generated by the scanner 213. The scanner 213 reads out an image on an original to generate image data (read image data). The image data generated by the scanner 213 is used in print processing executed by the printer 207, or is saved into the HDD 204. The operation unit 209 includes a liquid-crystal display unit equipped with a touch panel function, and a keyboard, and displays various screens. A user can input instructions and information to the printing apparatus 100 through the operation unit 209.

The wireless LAN chip 211 is a communication chip for realizing wireless communication (wireless LAN communication) based on a wireless LAN standard. The wireless LAN I/F 210 controls the wireless LAN chip 211 to realize wireless LAN communication with an external access point and an external apparatus, such as the mobile terminal 110. The wireless LAN I/F 210 and the wireless LAN chip 211 support wireless LAN standards, such as IEEE802.11a/b/g/n/ac. The wired LAN chip 215 is a communication chip that is connected to a wired LAN to realize communication via the wired LAN. The wired LAN I/F 214 controls the wired LAN chip 215 to realize communication with an external apparatus, such as a personal computer (PC) terminal, through the wired LAN.

The wireless LAN I/F 210 can operate in an infrastructure connection mode of connecting to an external apparatus via an external access point (relay apparatus), and a direct connection mode of wirelessly connecting directly to an external apparatus, rather than via an access point. In this specification, a function of realizing the operation of the wireless LAN I/F 210 (printing apparatus 100) in the direct connection mode is referred to as a "wireless direct function".

The printing apparatus 100 according to this embodiment supports the access point mode and Wi-Fi® Direct (hereafter referred to also as "WFD"), as mentioned above. The wireless LAN I/F 210 has an access point mode (AP mode) and a WFD mode as the direct connection mode. The wireless direct function is realized by operating the wireless LAN I/F 210 in the AP mode or the WFD mode. Thus, the wireless LAN I/F 210 can operate in the AP mode (first mode) of performing an access point operation to operate the printing apparatus as an access point, and in the WFD mode (second mode) of performing operation conforming to Wi-Fi® Direct.

In the AP mode, the wireless LAN I/F 210 performs the access point operation to operate the printing apparatus 100 as an access point of a wireless LAN for wireless direct connection with an external apparatus. In the WFD mode, the wireless LAN I/F 210 determines whether the printing apparatus 100 or an external apparatus operates as an access point (master device or group owner (GO)), through negotiation with an external apparatus to be connected with. Furthermore, the wireless LAN I/F 210 operates the printing apparatus 100 as an access point (master device) or a client (slave device) in a wireless LAN for wireless direct connection with the external apparatus, in accordance with the negotiation result.

Operation Screen of Printing Apparatus

Figure 3A:
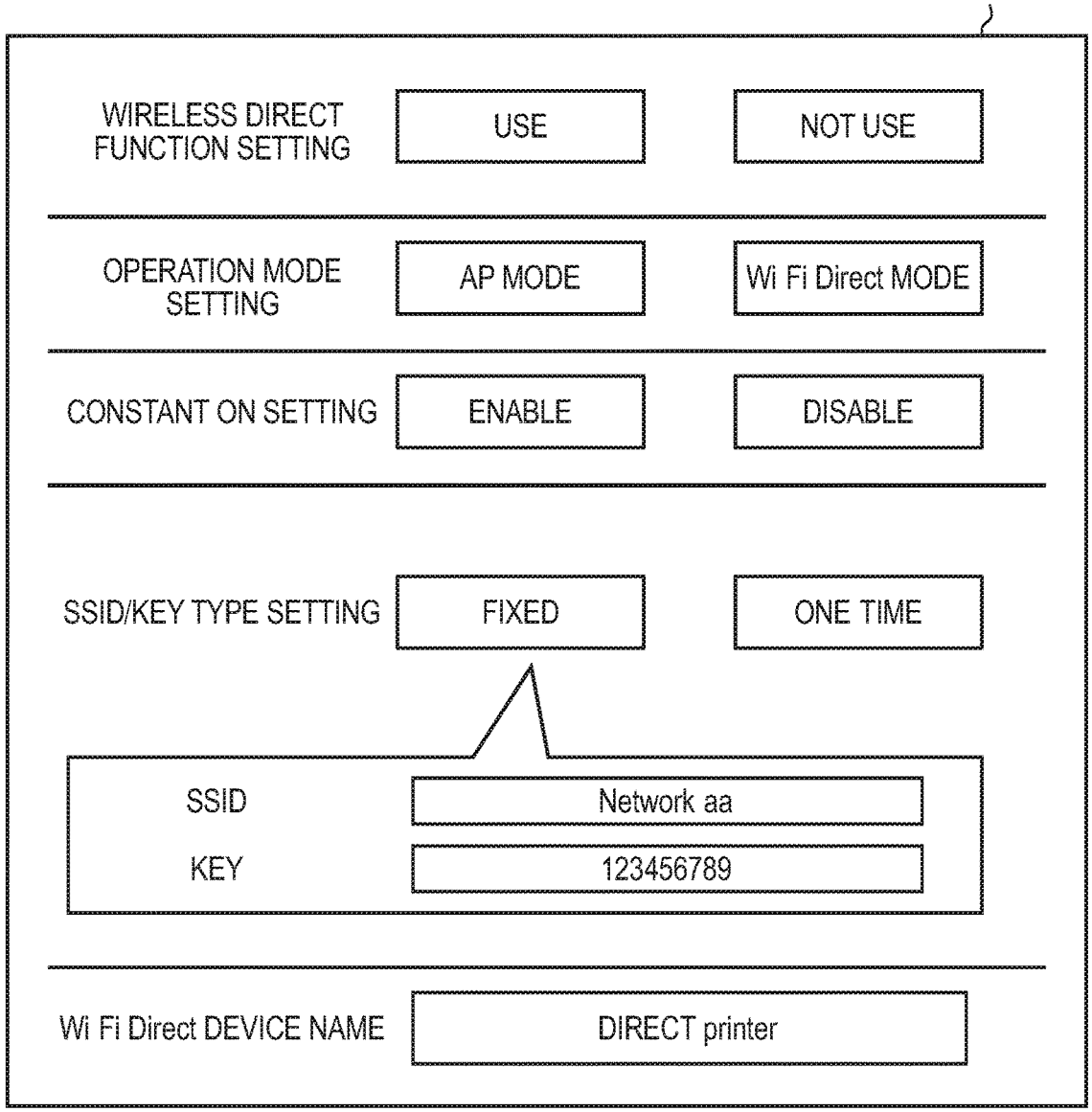
FIG. 3A shows an example of a setting screen for a wireless direct function.

FIG. 3A shows an example of an operation screen (setting screen 300) for setting the wireless direct function according to this embodiment. In the printing apparatus 100, setting values indicating settings configured in the setting screen 300 displayed on the operation unit 209 are stored in the HDD 204. If the ROM 203 has a nonvolatile RAM (NVRAM) area, the setting values may be stored in the NVRAM area.

In the setting screen 300, whether or not to use the wireless direct function (i.e., whether to turn on or off the wireless direct function) can be set. If the wireless direct function is set to OFF, the wireless direct function is disabled, and control is performed so that the wireless direct function cannot be used. In the setting screen 300, an operation mode pertaining to the wireless direct function can also be set. As a setting of the operation mode pertaining to the wireless direct function, the user can select one of the AP mode and the WFD mode, as shown in FIG. 3A. The CPU 201 operates the wireless direct function in the operation mode set in the setting screen 300.

In the setting screen 300, whether or not to configure a continuous-ON setting for the wireless direct function, i.e., whether or not to continuously turn on the wireless direct function can also be set. If "enable" is selected for the continuous-ON setting in the setting screen 300, the CPU 201 configures the continuous-ON setting for the wireless direct function. If "disable" is selected for the continuous-ON setting, the CPU 201 does not configure the continuous-ON setting for the wireless direct function. The CPU 201 performs processing to start the wireless direct function (i.e., causes the wireless LAN I/F 210 to start operation in the AP mode or the WFD mode) in accordance with a startup of the printing apparatus 100 if the continuous-ON setting is configured, or in accordance with a start instruction from the user if the continuous-ON setting is not configured. In this embodiment, the continuous-ON setting corresponds to a setting to continuously turn on the operation for wireless direct connection that is performed by the wireless LAN I/F 210.

The setting screen 300 also allows a setting of the type of service set identifier (SSID) to be used during the access point operation by the wireless LAN I/F 210, and a setting of a device name to be used during the operation in the WFD mode by the wireless LAN I/F 210. In this embodiment, a fixing mode (fixed SSID) or a one-time mode (one-time SSID) can be set as a setting of the SSID type.

If the fixed SSID is set, the printing apparatus 100 uses a preset SSID and KEY (password, encryption key, or connection key, etc.) as connection information necessary for wireless direct connection. Note that an SSID and a KEY to be used in the fixed mode may also be settable in the setting screen 300, as shown in FIG. 3A. If a one-time SSID is set, the printing apparatus 100 uses newly-generated SSID and KEY, i.e., an SSID and a KEY that differ from the previous ones, as connection information necessary for wireless direct connection, every time the wireless direct function is started.

Figure 3B:
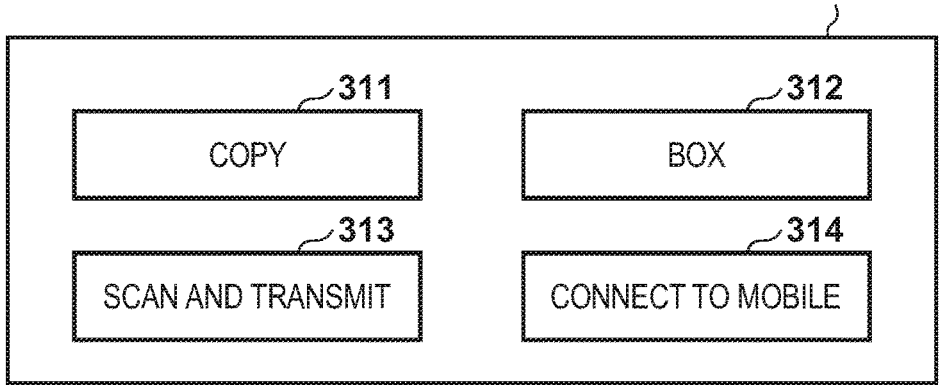
FIG. 3B shows an example of a menu screen of the printing apparatus.

FIG. 3B shows an example of a menu screen (menu screen 310) of the printing apparatus 100 displayed as an operation screen on the operation unit 209. Buttons 311 to 314 in the menu screen 310 correspond to a copy function, a BOX function, a scan/transmission function, and a mobile connection function (wireless direct function), respectively. The CPU 201 displays, on the operation unit 209, an operation screen for the function corresponding to one of the buttons 311 to 314 selected by the user. Note that the BOX function is a function of saving, into the HDD 204, image data obtained by scanning an image on an original. The scan/transmission function is a function of transmitting image data obtained by scanning an image on an original to an external apparatus by means of an electronic mail or a facsimile, for example.

Figure 4B:
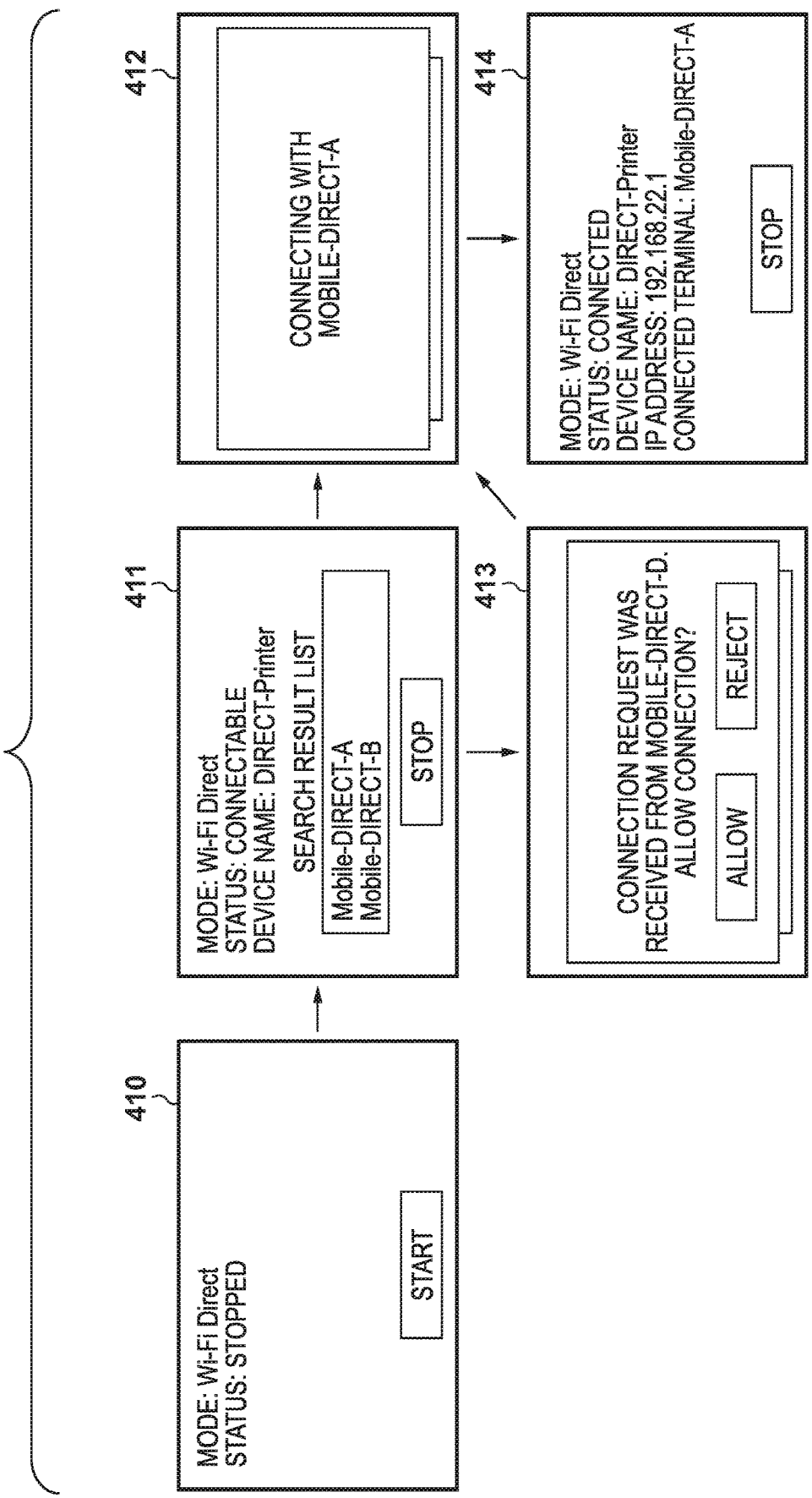

If the button 314 is selected (touched) in the menu screen 310 by the user, the CPU 201 displays the operation screen for the wireless direct function on the operation unit 209. At this time, the CPU 201 displays an operation screen corresponding to an operation mode that pertains to the wireless direct function and that is set using the setting screen 300. FIGS. 4A and 4B show examples of operation screens for the wireless direct function. Operation screens 400 to 402 correspond to the AP mode, and operation screens 410 to 414 correspond to the WFD mode. The CPU 201 displays the operation screen 400 if the operation mode is the AP mode, and displays the operation screen 410 if the operation mode is the WFD mode, in accordance with the selection of the button 314.

Operation Screen in AP Mode

In the operation screen 400, the user can give an instruction to start the wireless direct function in the AP mode, by operating a start button. If an instruction to start the wireless direct function is given through the operation screen 400, the CPU 201 starts the wireless direct function (i.e., turns on the wireless direct function) by causing the wireless LAN I/F 210 to start the operation in the AP mode (access point operation). Then, the CPU 201 changes the display on the operation unit 209 to the operation screen 401.

The operation screen 401 is displayed on the operation unit 209 if the wireless LAN I/F 210 has started the operation in the AP mode and is connectable with an external apparatus, but has not connected with any external apparatus. Upon the operation in the AP mode being started, the printing apparatus 100 enters a state of being able to accept wireless connection (wireless direct connection) from an external apparatus. The operation screen 401 displays connection information (SSID and KEY) necessary for an external apparatus, such as the mobile terminal 110, to wirelessly connect to the printing apparatus 100. If, in this state, the CPU 201 receives a request for connection using the SSID and KEY displayed in the operation screen 401 from an external apparatus, and establishes wireless connection with this external apparatus, the CPU 201 changes the display on the operation unit 209 to the operation screen 402.

The operation screen 402 is displayed on the operation unit 209 if the wireless LAN I/F 210 is operating in the AP mode and is connected with an external apparatus. In the operation screen 402, the user can give an instruction to stop the wireless direct function (i.e., to stop the operation in the AP mode). If a stop instruction is given (i.e., a stop button is selected) in the operation screen 402, the CPU 201 causes the wireless LAN I/F 210 to stop the operation in the AP mode. Upon the operation in the AP mode being stopped (i.e., upon the wireless direct function turning off), the printing apparatus 100 no longer accepts wireless connection from an external apparatus. If the wireless direct function has turned off, the CPU 201 changes the display on the operation unit 209 to the operation screen 400.

Operation Screen in WFD Mode

In the operation screen 410, the user can give an instruction to start the wireless direct function in the WFD mode, by operating a start button. If an instruction to start the wireless direct function is given in the operation screen 410, the CPU 201 causes the wireless LAN I/F 210 to start the operation in the WFD mode, thereby starting the wireless direct function (i.e., turning on the wireless direct function). Then, the CPU 201 changes the display on the operation unit 209 to the operation screen 411.

The operation screen 411 is displayed on the operation unit 209 if the wireless LAN I/F 210 has started the operation in the WFD mode and is connectable with an external apparatus, but has not connected with any external apparatus. The CPU 201 performs search processing to search for devices that are present around the printing apparatus 100 and support WFD, and displays, in the operation screen 411, a list of found devices as the search result. If one of the devices in the list displayed in the operation screen 411 is selected by the user, the CPU 201 starts negotiation for connection with the selected device, and changes the display on the operation unit 209 to the operation screen 412. Upon wireless connection with the selected devices being established, the CPU 201 displays the operation screen 414 on the operation unit 209.

The operation screen 414 is displayed on the operation unit 209 if the wireless LAN I/F 210 is operating in the WFD mode and is connected with an external apparatus. In the operation screen 414, the user can give an instruction to stop the wireless direct function (i.e., to stop the operation in the WFD mode). If a stop instruction is given (i.e., a stop button is selected) in the operation screen 414, the CPU 201 causes the wireless LAN I/F 210 to stop the operation in the WFD mode. If the operation in the WFD mode has stopped (i.e., the wireless direct function has turned off), the CPU 201 changes the display on the operation unit 209 to the operation screen 410.

If a WFD connection request is received from an external apparatus while the operation screen 411 is being displayed, the CPU 201 changes the display on the operation unit 209 to the operation screen 413. In the operation screen 413, the user can give an instruction to allow or not allow connection according to the WFD connection request. If an instruction to allow the connection is given in the operation screen 413, the CPU 201 starts negotiation for connection with the external apparatus that transmitted the WFD connection request, and changes the display on the operation unit 209 to the operation screen 412. Upon wireless connection with this external apparatus being established, the CPU 201 changes the display on the operation unit 209 to the operation screen 414. On the other hand, if an instruction to reject the connection is given in the operation screen 413, the CPU 201 does not start negotiation, and returns the display on the operation unit 209 to the operation screen 411.

Connection Processing

Figure 5:
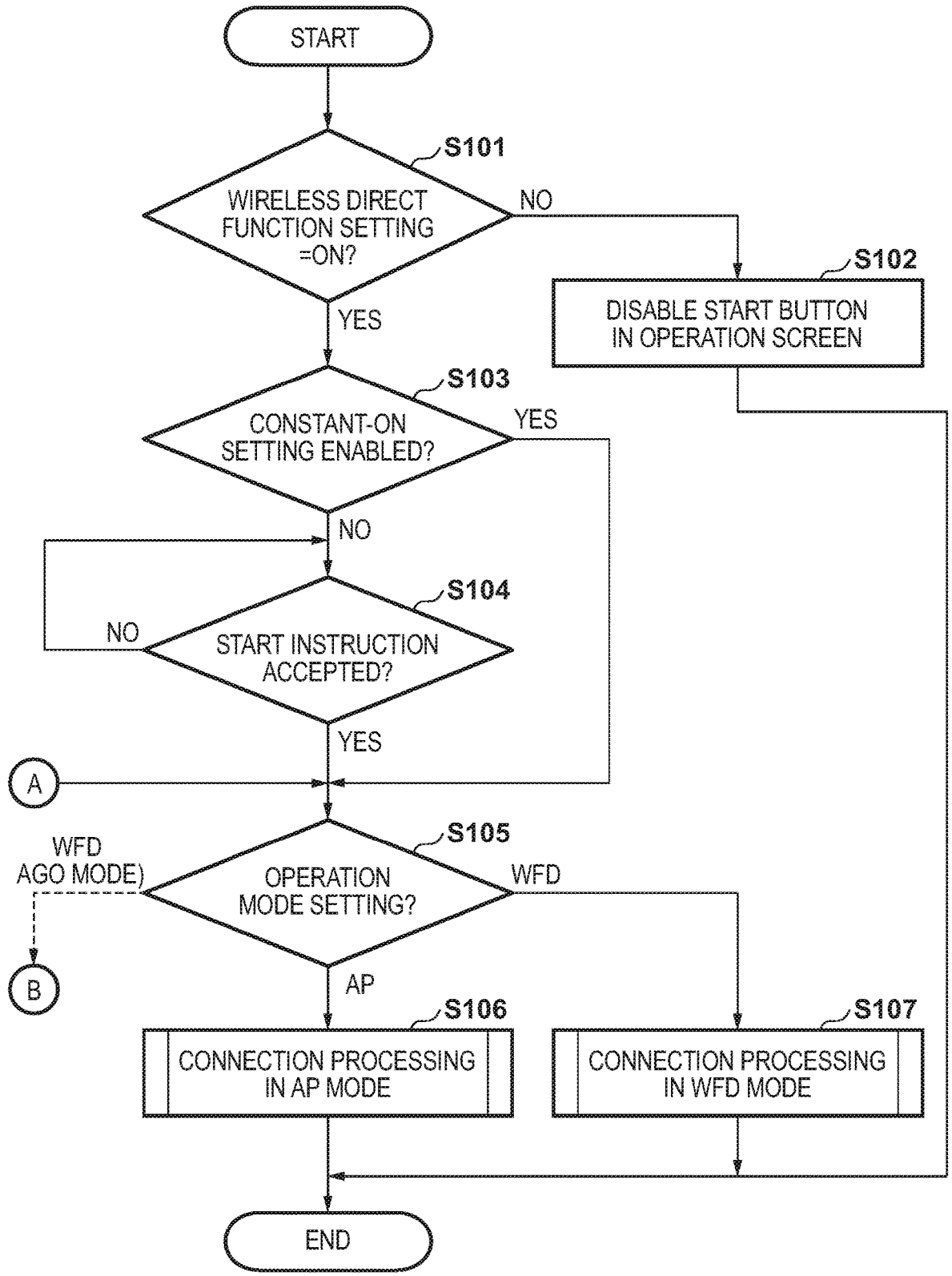
FIG. 5 is a flowchart illustrating a procedure of connection processing for wireless direct connection.

FIG. 5 is a flowchart illustrating a procedure of connection processing for wireless direct connection to be executed by the CPU 201 in the printing apparatus 100. Processing in each step shown in FIG. 5 is realized in the printing apparatus 100 by the CPU 201 loading and executing the control program stored in the ROM 203. Note that a portion indicated by dotted lines pertains to the later-described third embodiment, and is not used in this embodiment.

After the printing apparatus 100 has been powered on, in step S101, the CPU 201 determines whether or not a setting for using the wireless direct function has been configured (i.e., the wireless direct function setting is ON), based on a setting value stored in the HDD 204. The wireless direct function setting may be performed through the setting screen 300 by the user. The CPU 201 advances the processing to step S103 if the setting for using the wireless direct function has been configured, and, if not, advances the processing to step S102.

In step S102, in a case in which the operation screen 400 or 410 is displayed on the operation unit 209, the CPU 201 disables the "start" button (e.g., grays out the button or does not display the button). The user then cannot give an instruction to start the wireless direct function. Thereafter, the CPU 201 ends the processing.

On the other hand, in step S103, the CPU 201 determines whether or not the continuous-ON setting for the wireless direct function is enabled, based on a setting value stored in the HDD 204. The CPU 201 advances the processing to step S105 if the continuous-ON setting is enabled, and advances the processing to step S104 if the continuous-ON setting is disabled. In step S104, the CPU 201 waits for a start instruction from the user. The user can give a start instruction by touching the button 314 in the menu screen 310, and touching the start button in the operation screen 400 or 410. Note that the CPU 201 displays the operation screen 400 or 410 in accordance with the operation mode (AP mode or WFD mode) indicated by a setting value stored in the HDD 204, as mentioned above. If a start instruction is accepted through the operation screen 400 or 410, the CPU 201 advances the processing to step S105.

In step S105, the CPU 201 advances the processing to step S106 or step S107 in accordance with the setting of the operation mode pertaining to the wireless direct function. Specifically, if the operation is set to the AP mode, the CPU 201 advances the processing to step S106 and executes connection processing in the AP mode. On the other hand, if the operation mode is set to the WFD mode, the CPU 201 advances the processing to step S107 and executes connection processing in the WFD mode.

Connection Processing in AP Mode

Figure 6A:
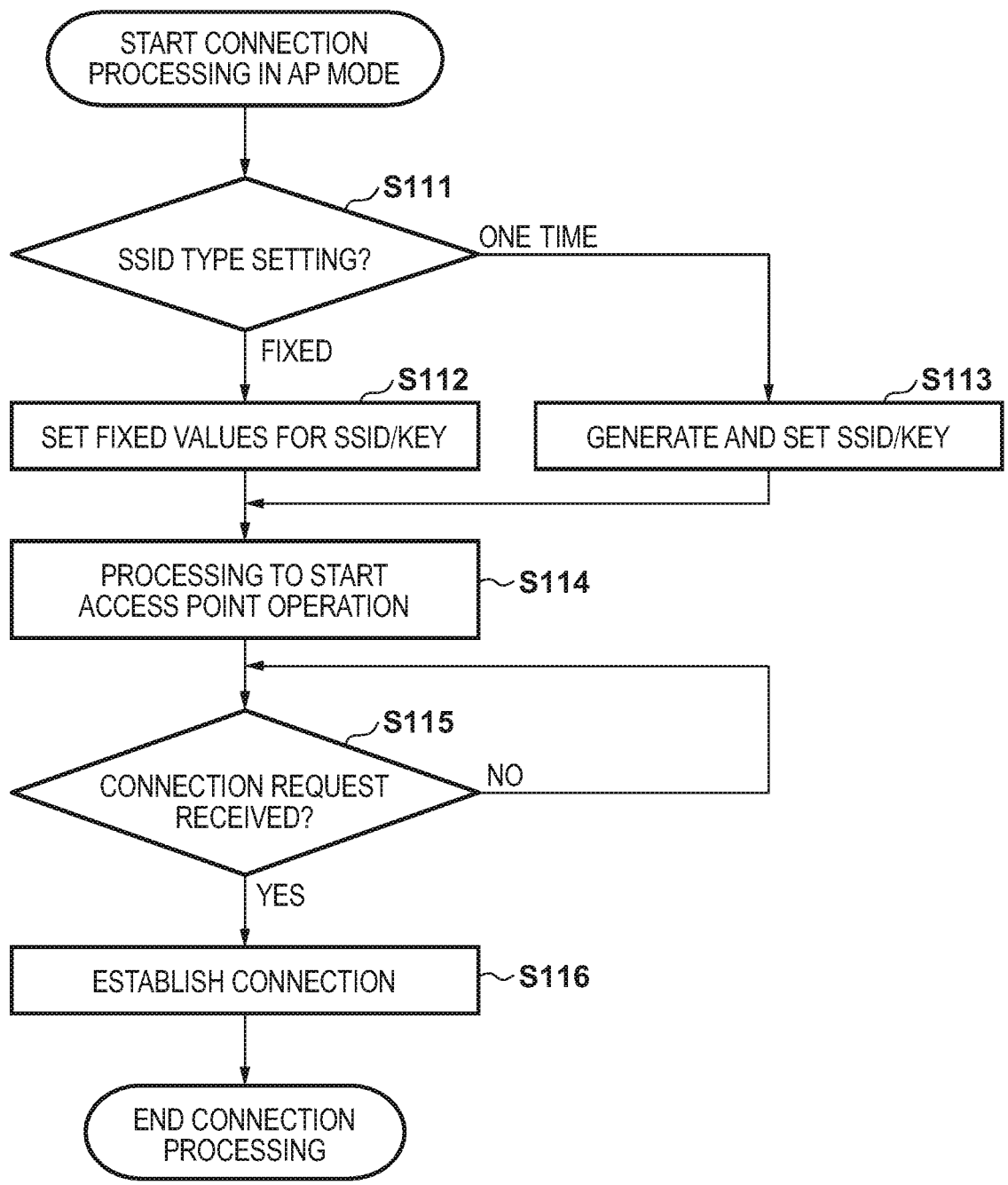
FIGS. 6A and 6B are flowcharts illustrating procedures of connection processing in an access point (AP) mode and a Wi-Fi® Direct (WFD) mode.

In step S106, the CPU 201 executes connection processing in the AP mode according to the procedure illustrated in FIG. 6A. Initially, in step S111, the CPU 201 determines the SSID type setting, based on a setting value stored in the HDD 204. If the SSID type is set to a fixed SSID, the CPU 201 advances the processing from step S111 to step S112. In step S112, the CPU 201 sets fixed values that are preset and stored in the HDD 204 as an SSID and a KEY (connection information) for the access point operation. If the SSID type is set to a one-time SSID, the CPU 201 advances the processing from step S111 to S113. In step S113, the CPU 201 newly generates an SSID and a KEY (connection information) using random numbers, and sets the generated SSID and KEY as the SSID and KEY for the access point operation.

After the processing in step S112 or step S113, in step S114, the CPU 201 turns on the operation state of the wireless direct function by causing the wireless LAN I/F 210 to start the access point operation (operation in the AP mode). Thus, the printing apparatus 100 enters a waiting state of waiting for a connection request from an external apparatus. At this time, the operation screen 401 is displayed on the operation unit 209.

Thereafter, in step S115, the CPU 201 determines whether or not a connection request has been received from an external apparatus (mobile terminal 110 in this example). If a connection request has been received, the CPU 201 advances the processing to step S116, and establishes a wireless connection (wireless direct connection) with the mobile terminal 110 in accordance with the received connection request. After the wireless connection has been established, the user can perform operations to cause the printing apparatus 100 to perform a print or a scan, for example, using the mobile terminal 110. At this time, the operation screen 402 is displayed on the operation unit 209. Note that, after the wireless connection has been established, the CPU 201 ends the processing according to the procedures in FIGS. 5 and 6A, and starts processing according to the procedure in FIG. 7.

Connection Processing WFD Mode

Figure 6B:
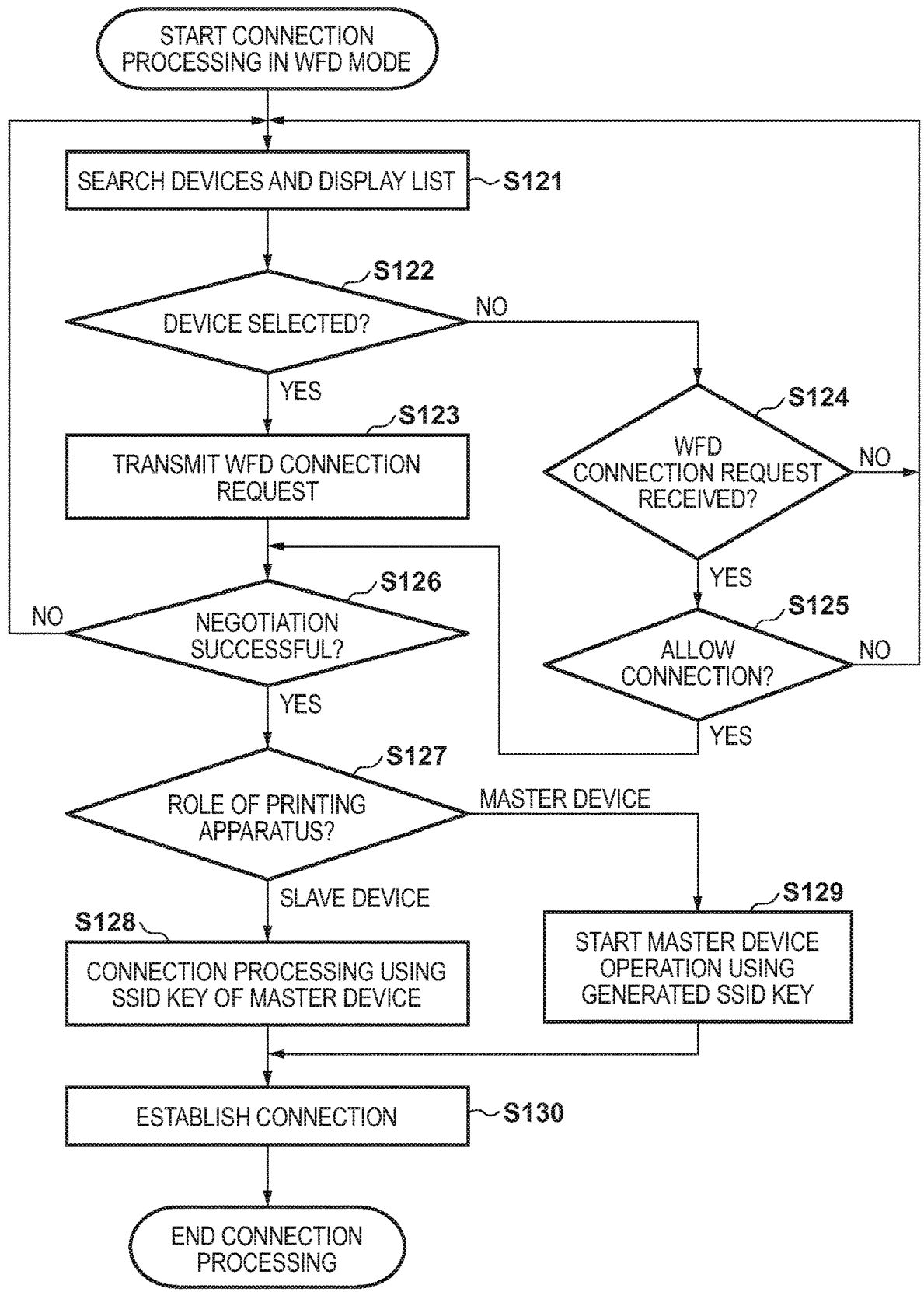

In step S107, the CPU 201 executes connection processing in the WFD mode according to a procedure illustrated in FIG. 6B. Initially, in step S121, the CPU 201 performs search processing to search for devices that support WFD, displays a list of found devices as the search result on the operation unit 209, and advances the processing to step S122. At this time, the operation screen 411 is displayed on the operation unit 209. In step S122, the CPU 201 determines whether or not a device has been selected from the device list by the user. If no device has been selected, the CPU 201 advances the processing to step S124. In step S124, the CPU 201 determines whether or not a WFD connection request has been received from an external apparatus. If no WFD connection request has been received, the CPU 201 returns the processing to step S121. The CPU 201 repeats the processing in steps S121, S122, and S124 until a device is selected from the device list ("YES" in step S122) or until a WFD connection request is received from an external apparatus ("YES" in step S124).

If a device is selected from the device list displayed on the operation unit 209 ("YES" in step S122), the CPU 201 advances the processing from step S122 to step S123. In step S123, the CPU 201 transmits a WFD connection request to the selected device (external apparatus), and starts to negotiate with the external apparatus. Thereafter, the CPU 201 advances the processing to step S126. It is assumed in this example that the mobile terminal 110 is selected.

On the other hand, if a WFD connection request is received from an external apparatus ("YES" in step S124), the CPU 201 advances the processing from step S124 to step S125. In step S125, the CPU 201 determines whether or not to allow connection based on this connection request, in accordance with an instruction from the user. At this time, the operation screen 413 is displayed on the operation unit 209. If an instruction to allow connection is given in the operation screen 413, the CPU 201 starts to negotiate with the external apparatus (mobile terminal 110 in this example) that transmitted the WFD connection request, and advances the processing to step S126. If an instruction to reject connection is given in the operation screen 413, the CPU 201 returns the processing to step S121.

While the negotiation with the external apparatus (mobile terminal 110) is being executed, the operation screen 412 is displayed on the operation unit 209. In step S126, if the negotiation with the external apparatus has failed, the CPU 201 returns the processing to step S121 and transitions to a state of repeating the processing in steps 121, S122, and S124 again. On the other hand, if the negotiation has been successful, the CPU 201 advances the processing to step S127. In step S127, the CPU 201 determines whether the role of the printing apparatus 100 has been determined as a master device or a slave device, as a result of negotiating with the external apparatus. If the role of the printing apparatus 100 has been determined as a slave device, the CPU 201 advances the processing to step S128. If the role of the printing apparatus 100 has been determined as a master device, the CPU 201 advances the processing to step S129.

In step S128, the CPU 201 starts to operate as a slave device (client) for WFD by performing processing to connect to the external apparatus (mobile terminal 110) using the SSID and the KEY of the external apparatus that are obtained through the negotiation with the external apparatus. On the other hand, in step S129, the CPU 201 newly generates an SSID and a KEY using random numbers, and starts to operate as a master device (access point) for WFD using the generated SSID and KEY.

Figure 7:
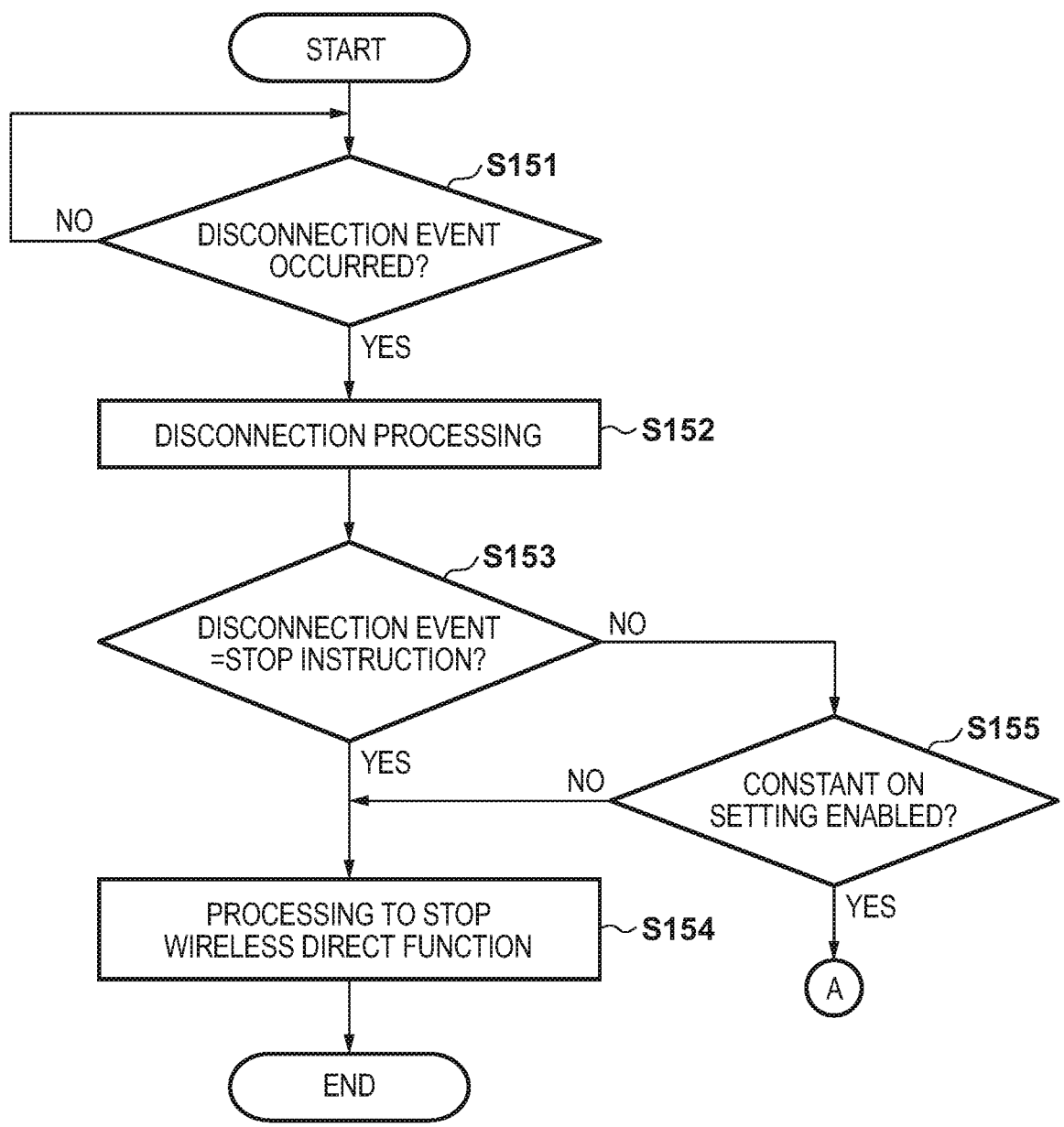
FIG. 7 is a flowchart illustrating a procedure of disconnection processing.

After step S128 or step S129, upon wireless connection with the external apparatus (mobile terminal 110), which is a WFD connection target, being established in step S130, the CPU 201 ends the processing according to the procedure in FIGS. 5 and 6B, and starts processing according to the procedure in FIG. 7. At this time, the operation screen 414 is displayed on the operation unit 209. For example, as shown in FIGS. 4A and 4B, an internet protocol (IP) address and a WFD device name of the printing apparatus 100, and a WFD device name of the connected external apparatus may be displayed in the operation screen 414.

Disconnection Processing

FIG. 7 is a flowchart illustrating a procedure of disconnection processing to disconnect wireless connection with be executed by the CPU 201 in the printing apparatus 100. Processing in each step in FIG. 7 is realized in the printing apparatus 100 by the CPU 201 loading and executing the control program stored in the ROM 203.

While wireless connection with an external apparatus (mobile terminal 110 in this example) is established, in step S151, the CPU 201 determines whether or not a disconnection event to disconnect wireless connection has occurred. For example, disconnection events include in which a stop button is touched in the operation screen 402 or 414, a case in which a disconnection request is received from the mobile terminal 110, a case in which transmission and reception of radio waves by the wireless LAN chip 211 stop, and a case in which the duration time of wireless connection has reached maximum connection time that is preset in the printing apparatus 100. If any of the disconnection events has occurred, the CPU 201 advances the processing to step S152.

In step S152, the CPU 201 performs processing to disconnect wireless connection with the mobile terminal 110. At this point in time, only the wireless connection with the mobile terminal 110 is disconnected, whereas the operation state of the wireless direct function is ON. That is to say, the operation in the AP mode or the WFD mode of the wireless LAN I/F 210 is continuing.

Next, in step S153, the CPU 201 determines whether or not the disconnection event in step S151 is a stop instruction that is given by the user using the stop button in the operation screen 402 or 414. If the disconnection event is a stop instruction, the CPU 201 advances the processing to step S154. In step S154, the CPU 201 performs processing to stop the wireless direct function to turn off the wireless direct function, and ends the processing. Specifically, the CPU 201 causes the wireless LAN I/F 210 to stop the operation in the AP mode or the WFD mode.

On the other hand, if the disconnection event is not a stop instruction from the user, the CPU 201 advances the processing to step S155. In step S155, the CPU 201 determines whether or not the continuous-ON setting of the wireless direct function is enabled. If the continuous-ON setting is enabled, the CPU 201 advances the processing to step S105 (FIG. 5), since the wireless direct function is not to turn off. Thus, the printing apparatus 100 does not turn off the wireless direct function, and maintains a state in which it is connectable with an external apparatus again in the AP mode and WFD mode. On the other hand, if the continuous-ON setting is disabled, the CPU 201 advances the processing to step S154, turns off the wireless direct function, and ends the processing.

As described above, according to this embodiment, the wireless LAN I/F 210 can operate in the first mode (AP mode) of performing the access point operation to cause the printing apparatus to operate as an access point, and in the WFD mode (second mode) of operating according to WFD. The CPU 201 sets one of the AP mode and the WFD mode as an operation mode to be used for wireless direct connection with an external apparatus, in accordance with an instruction from the user. Furthermore, the CPU 201 performs control to cause the wireless LAN I/F 210 to start the operation in the AP mode if the AP mode is set as the operation mode, and to cause the wireless LAN I/F 210 to start the operation in the WFD mode if the WFD mode is set as the operation mode.

According to this embodiment, the user can appropriately understand the operation mode that is used in the printing apparatus 100 for wireless direct connection with an external apparatus. Specifically, one of the operation modes, namely the AP mode and the WFD mode is selectable in the setting screen 300 for the wireless direct function. Furthermore, the wireless LAN I/F 210 is controlled so as not to operate in an operation mode that is not selected, and operate in the selected operation mode. Thus, the user can appropriately understand whether the printing apparatus 100 is operating in the AP mode or the WFD mode. As a result, the user can appropriately operate the mobile terminal 110 to connect the mobile terminal 110 to the printing apparatus 100.

Second Embodiment

In the first embodiment, the printing apparatus 100 selects which one of the AP mode and the WFD mode to use as the operation mode pertaining to the wireless direct function, in accordance with the content that is set in advance in the setting screen (FIG. 3A). The second embodiment will describe an example of allowing the user to select which one of the AP mode and the WFD mode to use when the wireless direct function is started. Note that descriptions of the content common to the first embodiment are omitted below.

FIG. 8A shows an example of an operation screen for the wireless direct function according to this embodiment. In this embodiment, if the wireless direct function is selected (i.e., the button 314 is touched) in the menu screen 310 by the user, the CPU 201 displays an operation screen 800, which is shown in FIG. 8A, on the operation unit 209. In the operation screen 800, the user can select one of the AP mode and the WFD mode as the operation mode pertaining to the wireless direct function. The operation screen 800 indicates a state in which the AP mode is selected. On the other hand, an operation screen 810 indicates that the WFD mode is selected.

If a start instruction is given (i.e., a start button is touched) by the user with the AP mode selected as the operation mode (operation screen 800), the CPU 201 causes the wireless LAN I/F 210 to start the operation in the AP mode. The CPU 201 also changes the display on the operation unit 209 to an operation screen 801.

The operation screen 801 is displayed on the operation unit 209 if the wireless LAN I/F 210 has started the operation in the AP mode and is connectable with an external apparatus, but has not connected with any external apparatus. The operation screen 801 does not display the WFD mode so that the WFD mode is unselectable. Note that the WFD mode may be grayed out in the operation screen 801. Upon wireless connection with an external apparatus being established with the operation screen 801 displayed on the operation unit 209, the CPU 201 changes the display on the operation unit 209 to the operation screen 402 (FIG. 4A). In this embodiment, if the wireless direct function turns off, the CPU 201 changes the display on the operation unit 209 from the operation screen 402 to the operation screen 800.

On the other hand, if a start instruction is given (i.e., a start button is touched) by the user with the WFD mode selected as the operation mode (operation screen 810), the CPU 201 causes the wireless LAN I/F 210 to start the operation in the WFD mode. The CPU 201 also changes the display on the operation unit 209 to an operation screen 811.

The operation screen 811 is displayed on the operation unit 209 if the wireless LAN I/F 210 has started the operation in the WFD mode and is connectable with an external apparatus, but has not connected with any external apparatus. The operation screen 811 does not display the AP mode so that the AP mode is unselectable. Note that the AP mode may be grayed out in the operation screen 811. If a device is selected or a WFD connection request is received with the operation screen 811 displayed on the operation unit 209, the CPU 201 thereafter performs the same processing as that in the first embodiment. That is to say, the CPU 201 displays the operation screen 412 or 413 on the operation unit 209, and executes the above-described processing.

In this embodiment, for example, at least one of the AP mode and the WFD mode may be selectable as a setting of the operation mode in the setting screen 300 (FIG. 3A). In this case, if one of the AP mode and the WFD mode is set as the operation mode through the setting screen 300, the CPU 201 executes the same processing as that in the first embodiment. On the other hand, if both the AP mode and the WFD mode are set as the operation mode through the setting screen 300, the CPU 201 executes the above-described processing according to this embodiment.

As described above, according to this embodiment, when causing the wireless LAN I/F 210 to start the operation for wireless direct connection, the CPU 201 displays the operation screens 800 and 801 on the operation unit 209, and accepts selection of the AP mode or the WFD mode by the user. Furthermore, the CPU 201 sets an operation mode selected through the operation screens 800 and 801 as the operation mode to be used for wireless direct connection.

According to this embodiment, in the case of connecting the mobile terminal 110 to the printing apparatus 100 by means of wireless direct connection, the user can select the operation mode when starting the wireless direct function of the printing apparatus 100. Thus, the operation mode of the wireless LAN I/F 210 to be connected can be appropriately set in accordance with a function provided in the mobile terminal 110 carried by the user (i.e., whether or not the mobile terminal 110 is to connect with the printing apparatus 100 in the WFD mode). Accordingly, the operation mode of the wireless LAN I/F 210 can be flexibly set in accordance with the needs of the user.

Third Embodiment

The Wi-Fi® Direct standard provides not only the operation to determine a group owner through negotiation between terminals, but also provides that any one of the terminals autonomously acts as a GO (group owner), without conducting negotiation. Such an operation mode will be hereafter referred to as an "autonomous GO mode (AGO mode)". Note that an operation mode in which negotiation is conducted will be referred to as a "negotiation mode". This embodiment will describe an example in which, if the WFD mode is set as the operation mode pertaining to the wireless direct function, the user can set the negotiation mode or the AGO mode as an operation setting for the WFD mode. Note that descriptions of the content common to the first and second embodiments are omitted below.

Operation Screen of Printing Apparatus

Figure 9:
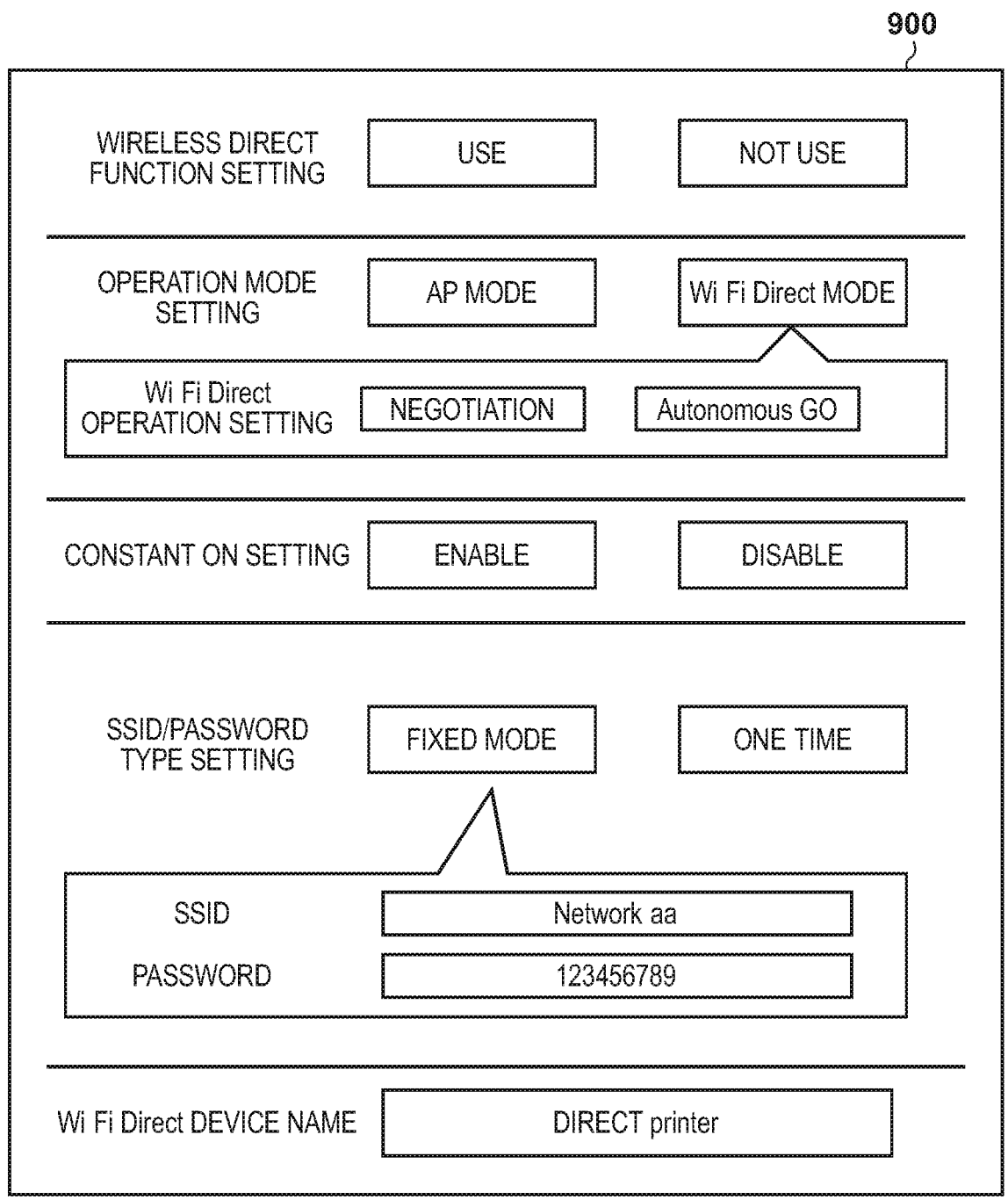
FIG. 9 shows an example of a setting screen for the wireless direct function according to the third embodiment.

FIG. 9 shows an example of an operation screen (setting screen 900) for setting the wireless direct function according to this embodiment. The setting screen 900 differs from the setting screen 300 (FIG. 3A) in the first embodiment in that, for the WFD mode, the user can select one of the negotiation mode (first operation setting) and the AGO mode (second operation setting) as the operation setting for the WFD mode.

If the WFD mode is set as the operation mode pertaining to the wireless direct function, the CPU 201 operates the wireless LAN I/F 210 in accordance with the operation setting that is selected from the negotiation mode and the AGO mode through the setting screen 900. That is to say, if the negotiation mode is selected, the CPU 201 determines the role (master device or slave device) of the printing apparatus 100 (i.e., determines which apparatus is to operate as an access point) through negotiation with the external apparatus, similarly to the first and second embodiments. On the other hand, if the AGO mode is selected, the CPU 201 determines that the printing apparatus 100 is to act as the master device (GO) (i.e., to operate as an access point), without conducting negotiation with the external apparatus.

FIG. 8B shows an example of an operation screen for the wireless direct function according to this embodiment. In this embodiment, if the button 314 is touched in the menu screen 310, the CPU 201 displays one of the operation screens 400, 410, and 850 on the operation unit 209. Specifically, if the AP mode is set as the operation mode, the operation screen 400 is displayed. If the WFD mode is set as the operation mode, and the negotiation mode is selected as the operation setting for the WFD mode, the operation screen 410 is displayed. If the WFD mode is set as the operation mode, and the AGO mode is selected as the operation setting for the WFD mode, the operation screen 850 shown in FIG. 8B is displayed. Note that, as for the AP mode and the WFD mode (negotiation mode), connection processing for wireless direct connection is the same as that in the first embodiment.

If a start button is touched in the operation screen 850, the CPU 201 causes the wireless LAN I/F 210 to start the operation in the WFD mode, and changes the display on the operation unit 209 to an operation screen 851. At this time, the CPU 201 realizes the operation in the WFD mode with the AGO mode. That is to say, the CPU 201 sets an SSID and a KEY (connection information) to operate as a master device, without negotiating with the external apparatus.

The operation screen 851 is displayed on the operation unit 209 if the wireless LAN I/F 210 has started the operation in the WFD mode (AGO mode) and is connectable with an external apparatus. The set SSID and KEY, and a device name to be used in the operation in the WFD mode are displayed in the operation screen 851. If a WFD connection request is received from an external apparatus while the operation screen 851 is being displayed, the CPU 201 changes the display on the operation unit 209 to an operation screen 852. The CPU 201 thus confirms with the user whether or not to allow connection according to the WFD connection request.

If an instruction to allow the connection is given in the operation screen 852, the printing apparatus 100 establishes connection with the external apparatus that transmitted the WFD connection request, and changes the display on the operation unit 209 to an operation screen 853. On the other hand, if an instruction to reject the connection is given in the operation screen 852, the connection is not established, the display on the operation unit 209 is returned to the operation screen 851. If a connection request in the AP mode is received from an external apparatus while the operation screen 851 is being displayed, the display on the operation unit 209 is changed to the operation screen 853, and connection with this external apparatus is established.

Connection Processing

Figure 10:
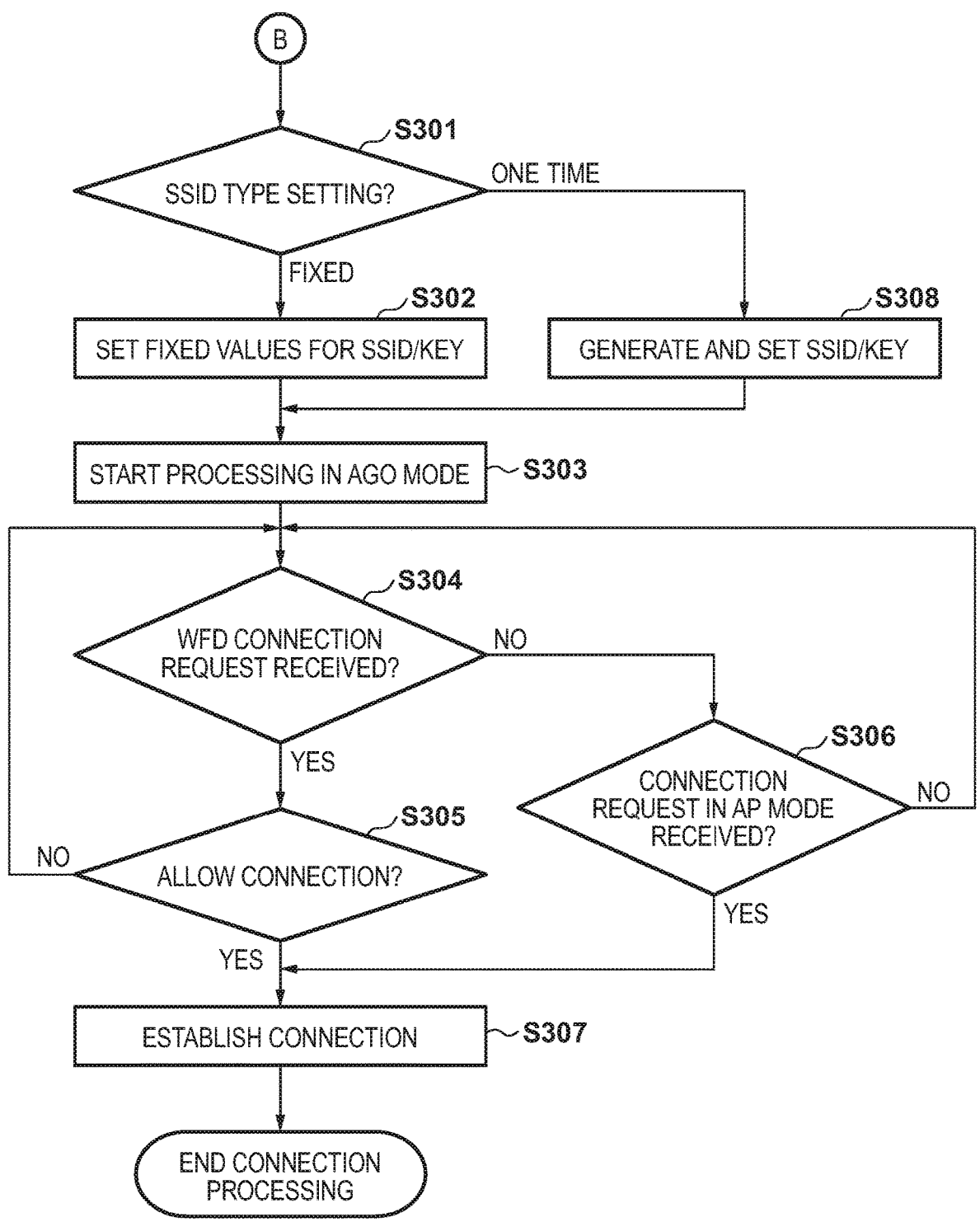
FIG. 10 is a flowchart illustrating a procedure of connection processing in the WFD mode (an autonomous group owner (AGO) mode) according to the third embodiment.

In this embodiment, the CPU 201 performs connection processing for wireless direct connection according to the procedure in FIG. 5, similarly to the first embodiment. If, however, in step S105, the WFD mode is set as the operation mode pertaining to the wireless direct function, and the AGO mode is selected as the operation setting for the WFD mode, the CPU 201 advances the processing to step S301 in FIG. 10. FIG. 10 is a flowchart illustrating a procedure of connection processing in the WFD mode in a case in which the AGO mode is set.

In steps S301, S302 and S308, the CPU 201 sets an SSID and a KEY (connection information) necessary for an external apparatus to connect to the printing apparatus 100 when the printing apparatus 100 operates as a master device (access point), similarly to steps S111 to S113.

Next, in step S303, the CPU 201 starts processing in the AGO mode. That is to say, the CPU 201 displays the operation screen 851 on the operation unit 209, entering a state of waiting for a connection request from an external apparatus. Thereafter, in step S304, the CPU 201 determines whether or not a WFD connection request has been received from an external apparatus, and advances the processing to step S306 if no WFD connection request has been received. In step S306, the CPU 201 determines whether or not a connection request in the AP mode (including an SSID and a KEY) has been received from an external apparatus, and returns the processing to step S304 if no connection request in the AP mode has been received.

If, in step S304, a WFD connection request has been received, the CPU 201 advances the processing to step S305. In step S305, the CPU 201 displays the operation screen 852 and determines whether or not to allow connection according to the connection request, in accordance with an instruction from the user. If an instruction to allow the connection is given, the CPU 201 advances the processing to step S307, establishes connection with the external apparatus that transmitted the WFD connection request, and ends the connection processing. On the other hand, if an instruction to reject the connection is given, the CPU 201 returns the processing to step S304. If, in step S306, a connection request in the AP mode has been received, the CPU 201 advances the processing to step S307, establishes connection with the external apparatus that transmitted this connection request, and ends the connection processing.

According to this embodiment, the AP mode and the WFD mode can be selectively set, and if the WFD mode is selected, the negotiation mode (first operation setting) and the AGO mode (second operation setting) can also be selectively set. Thus, the operation mode of the wireless LAN I/F 210 to be connected can be appropriately set in accordance with a function provided in the mobile terminal 110 carried by the user (i.e., whether or not the mobile terminal 110 is to connect to the printing apparatus 100 in the WFD mode). Accordingly, the operation mode of the wireless LAN I/F 210 can be flexibly set in accordance with the needs of the user.

Note that, in this embodiment, the user may be able to select the operation mode and to select the operation setting for the WFD mode when the wireless direct function is started, similarly to the second embodiment.

Fourth Embodiment

The fourth embodiment will describe an example of automatically disabling the continuous-ON setting if the WFD mode is set as the operation mode pertaining to the wireless direct function. Note that descriptions of the content common to the first to third embodiments are omitted below.

If the wireless direct function is started in the WFD mode, the CPU 201 displays a confirmation screen, such as the operation screen 413 (FIG. 4B), on the operation unit 209 every time a WFD connection request is received from an external apparatus, as described in the first embodiment. Usually, external apparatuses capable of transmitting a WFD connection request to the printing apparatus 100 are not limited. For this reason, a third party can continue to repeatedly transmit WFD connection requests to the printing apparatus 100 using a specific mobile terminal for the purpose of attacking the printing apparatus 100. Consequently, if the wireless direct function is continuously in an ON state, the printing apparatus 100 continues to be in a state in which the confirmation screen, such as the operation screen 413, is displayed on the operation unit 209, and is thus prevented from operating normally.

In this embodiment, to avoid the foregoing state occurring in the printing apparatus 100, if the WFD mode is set as the operation mode pertaining to the wireless direct function, the continuous-ON setting for the wireless direct function is automatically disabled. That is to say, if the WFD mode is set as the operation mode, the CPU 201 causes the wireless LAN I/F 210 to start the operation in the WFD mode in accordance with a start instruction from the user, regardless of whether or not the continuous-ON setting is configured.

Specifically, in step S103 (FIG. 5), the CPU 201 always advances the processing to the S104 even if "enable" is set for the continuous-ON setting in the setting screen 300. That is to say, in step S104, the CPU 201 waits for a start instruction from the user, and executes the processing in step S105 and subsequent steps upon accepting a start instruction. Note that the processing in step S105 and subsequent steps is the same as that in the first embodiment.

According to this embodiment, if the WFD is set as the operation mode pertaining to the wireless direct function, the continuous-ON setting is automatically disabled. Thus, the operation in the WFD mode can be realized more securely in the printing apparatus 100.

Other Embodiments

Embodiments of the present invention can also be realized by a computer of a system or an apparatus that reads out and executes computer executable instructions (e.g., one or more programs) recorded on a storage medium (which may also be referred to more fully as 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:
(A) a wireless communication interface capable of operating in (1) a first mode for a wireless direct communication function, in which the wireless communication interface performs an access point operation to cause the printing apparatus to operate as a software access point for performing wireless direct communication with an external apparatus rather than via an external access point, and (2) a second mode for the wireless direct communication function, in which the wireless communication interface performs an operation conforming to Wi-Fi® Direct;
(B) at least one memory that stores a set of instructions; and
(C) at least one processor that executes instructions, of the set of instructions, to cause the printing apparatus to perform operations comprising:
 (a) setting one of the first mode and the second mode as an operation mode for the wireless direct communication function, in accordance with an instruction from a user via a setting screen;
 (b) causing, in accordance with accepting an instruction to start an operation for the wireless direct communication function, the wireless communication interface to operate in the first mode for the wireless direct communication function if the first mode is set as the operation mode, and causing the wireless communication interface to operate in the second mode for the wireless direct communication function if the second mode is set as the operation mode; and (c) displaying, in accordance with accepting a predetermined user operation, a screen that is different from the setting screen and is related to the wireless direct communication function, wherein the screen comprises (i) information indicating the set operation mode, (ii) information indicating an execution status of the wireless direct communication corresponding to the set operation mode, and (iii) a first display item for stopping the operation for the wireless direct communication function.

2. The printing apparatus according to claim 1, wherein the at least one processor further executes the instructions to cause the printing apparatus to perform operations comprising:

in accordance with accepting a user operation to select the first display item, (d) stopping the operation for the wireless direct communication function and (e) updating the screen related to the wireless direct communication function such that a second display item for starting the operation for the wireless direct communication function is displayed in place of the first display item.

3. The printing apparatus according to claim 1, wherein the at least one processor further executes the instructions to cause the printing apparatus to perform operations comprising:

(d) setting whether or not to continuously turn on the operation for the wireless direct communication function, based on an instruction from the user;

(e) performing, in a case in which the first mode is set as the operation mode and the setting to continuously turn on the operation for the wireless direct communication function is performed, control for causing the wireless communication interface to start to operate in the first mode, as one processing in a start sequence of the printing apparatus that is performed in response to the printing apparatus being turned on; and (f) performing, in a case in which the second mode is set as the operation mode, control for causing the wireless communication interface to start to operate in the second operation mode in accordance with accepting a user operation for starting an operation for the wireless direct communication function after the printing apparatus starts and shifts to a normal operation state, without performing, as one processing in the start sequence of the printing apparatus that is performed in response to the printing apparatus being turned on, the control for causing the wireless communication interface to start to operate in the second mode, even if the setting to continuously turn on the operation for the wireless direct communication function is performed.

4. The printing apparatus according to claim 1, wherein, in the first mode, the wireless communication interface establishes wireless direct connection with an external apparatus if a connection request from the external apparatus is received while the wireless communication interface is performing the access point operation, and wherein the at least one processor further executes the instructions to cause the printing apparatus to perform an operation comprising (d) determining, in the second mode, which of the printing apparatus and an external apparatus to be connected is to operate as an access point, through negotiation with the external apparatus, and the wireless communication interface establishes wireless direct connection with the external apparatus after the negotiation is completed.

5. The printing apparatus according to claim 1, wherein the at least one processor further executes the instructions to cause the printing apparatus to perform an operation comprising:

(d) setting, for the second mode, in accordance with an instruction from the user, one of a first operation setting to determine which of the printing apparatus and an external apparatus is to operate as an access point through negotiation with the external apparatus, and a second operation setting to make the printing apparatus operate as an access point without conducting the negotiation; and (e) causing, if the second mode is set as the operation mode, the wireless communication interface to operate in accordance with the operation setting set from the first operation setting and the second operation setting.

6. A method of controlling a printing apparatus that includes a wireless communication interface capable of operating in (1) a first mode for a wireless direct communication function, in which the wireless communication interface performs an access point operation to cause the printing apparatus to operate as a software access point for performing wireless direct communication with an external apparatus rather than via an external access point, and (2) a second mode for the wireless direct communication function, in which the wireless communication interface performs an operation conforming to Wi-Fi® Direct, the method comprising:

setting one of the first mode and the second mode as an operation mode for the wireless direct communication function, in accordance with an instruction from a user via a setting screen;

causing, in accordance with accepting an instruction to start an operation for the wireless direct communication function, the wireless communication interface to operate in the first mode for the wireless direct communication function if the first mode is set as the operation mode, and causing the wireless communication interface to operate in the second mode for the wireless direct communication function if the second mode is set as the operation mode; and displaying, in accordance with accepting a predetermined user operation, a screen that is different from the setting screen and is related to the wireless direct communication function, wherein the screen comprises (i) information indicating the set operation mode, (ii) information indicating an execution status of the wireless direct communication corresponding to the set operation mode, and (iii) a first display item for stopping the operation for the wireless direct communication function.

7. The method according to claim 6, further comprising:
in accordance with accepting a user operation to select the first display item, stopping the operation for the wireless direct communication function, and updating the screen related to the wireless direct communication function such that a second display item for starting the operation for the wireless direct communication function is displayed in place of the first display item.

8. The method according to claim 6, further comprising:
setting whether or not to continuously turn on the operation for the wireless direct communication function, based on an instruction from the user;

performing, in a case in which the first mode is set as the operation mode and the setting to continuously turn on the operation for the wireless direct communication function is performed, control for causing the wireless communication interface to start to operate in the first mode, as one processing in a start sequence of the printing apparatus that is performed in response to the printing apparatus being turned on; and performing, in a case in which the second mode is set as the operation mode, control for causing the wireless communication interface to start to operate in the second operation mode in accordance with accepting a user operation for starting an operation for the wireless direct communication function after the printing apparatus starts and shifts to a normal operation state, without performing, as one processing in the start sequence of the printing apparatus that is performed in response to the printing apparatus being turned on, the control for causing the wireless communication interface to start to operate in the second mode, even if the setting to continuously turn on the operation for the wireless direct communication function is performed.

9. The method according to claim 6, wherein, in the first mode, the wireless communication interface establishes wireless direct connection with an external apparatus if a connection request from the external apparatus is received while the wireless communication interface is performing the access point operation, and wherein the method further comprises determining, in the second mode, which of the printing apparatus and an external apparatus to be connected is to operate as an access point, through negotiation with the external apparatus, and the wireless communication interface establishes wireless direct connection with the external apparatus after the negotiation is completed.

10. The method according to claim 6, further comprising:
setting, for the second mode, in accordance with an instruction from the user, one of a first operation setting to determine which of the printing apparatus and an external apparatus is to operate as an access point through negotiation with the external apparatus, and a second operation setting to make the printing apparatus operate as an access point without conducting the negotiation; and causing, if the second mode is set as the operation mode, the wireless communication interface to operate in accordance with the operation setting set from the first operation setting and the second operation setting.

11. A non-transitory computer-readable storage medium storing a computer program for causing a computer to execute a method of controlling a printing apparatus that includes a wireless communication interface capable of operating in (1) a first mode for a wireless direct communication function, in which the wireless communication interface performs an access point operation to cause the printing apparatus to operate as a software access point for performing wireless direct communication with an external apparatus rather than via an external access point, and (2) a second mode for the wireless direct communication function, in which the wireless communication interface performs operation conforming to Wi-Fi® Direct, the method comprising:

setting one of the first mode and the second mode as an operation mode for the wireless direct communication function, in accordance with an instruction from a user via a setting screen;

causing, in accordance with accepting an instruction to start an operation for the wireless direct communication function, the wireless communication interface to operate in the first mode for the wireless direct communication function if the first mode is set as the operation mode, and causing the wireless communication interface to operate in the second mode for the wireless direct communication function if the second mode is set as the operation mode; and displaying, in accordance with accepting a predetermined user operation, a screen that is different from the setting screen and is related to the wireless direct communication function, wherein the screen comprises (i) information indicating the set operation mode, (ii) information indicating an execution status of the wireless direct communication corresponding to the set operation mode, and (iii) a first display item for stopping the operation for the wireless direct communication function.

* * * * *